(12) United States Patent
Sharma et al.

(10) Patent No.: US 11,032,078 B2
(45) Date of Patent: Jun. 8, 2021

(54) METHOD AND SYSTEM FOR BLOCKCHAIN WALLET DYNAMIC PRIVATE KEY

(71) Applicant: MASTERCARD INTERNATIONAL INCORPORATED, Purchase, NY (US)

(72) Inventors: Madhavi Sharma, Haryana (IN); Chandan Garg, Punjab (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 319 days.

(21) Appl. No.: 16/266,251

(22) Filed: Feb. 4, 2019

(65) Prior Publication Data

US 2020/0252216 A1 Aug. 6, 2020

(51) Int. Cl.
*H04L 9/32* (2006.01)
*H04L 9/06* (2006.01)
*H04L 9/08* (2006.01)

(52) U.S. Cl.
CPC .......... *H04L 9/3228* (2013.01); *H04L 9/0637* (2013.01); *H04L 9/0866* (2013.01); *H04L 9/3247* (2013.01); *H04L 2209/38* (2013.01); *H04L 2209/56* (2013.01)

(58) Field of Classification Search
CPC ... H04L 9/3228; H04L 9/0637; H04L 9/0866; H04L 9/3247
See application file for complete search history.

(56) References Cited

U.S. PATENT DOCUMENTS

| | | | |
|---|---|---|---|
| 9,736,147 B1 * | 8/2017 | Mead | H04L 9/3239 |
| 2005/0120245 A1 * | 6/2005 | Torisaki | H04L 9/3228 726/4 |
| 2014/0052436 A1 * | 2/2014 | Qian | G06F 40/129 704/9 |
| 2016/0070901 A1 * | 3/2016 | Kim | G06F 21/34 726/19 |
| 2018/0331833 A1 * | 11/2018 | Tomlinson | H04L 9/0894 |
| 2020/0034345 A1 * | 1/2020 | Ikai | G06F 16/245 |

* cited by examiner

*Primary Examiner* — Vance M Little

(74) *Attorney, Agent, or Firm* — Buchanan Ingersoll & Rooney PC (57) ABSTRACT

A method for providing additional security for a blockchain wallet through the use of a dynamic pseudo key confirmed through digit positioning includes: storing digit pairs, each including a predefined value and a character position; receiving a dynamic pseudo key and transaction information, where the key includes characters in set positions and the transaction information includes a destination address and data value; validating that the dynamic pseudo key has not been used for a prior blockchain transaction; validating that the characters in set positions in the dynamic pseudo key includes the predefined value in the corresponding character position for each of the digit pairs; generating a digital signature using a private key after successful validation of the dynamic pseudo key; and transmitting the digital signature and transaction information to a node in a blockchain network associated with a blockchain.

16 Claims, 6 Drawing Sheets

METHOD AND SYSTEM FOR BLOCKCHAIN WALLET DYNAMIC PRIVATE KEY

FIELD

The present disclosure relates to providing additional security for a blockchain wallet through the use of a dynamic pseudo key, specifically the use of set digit position to enable a dynamic pseudo key to be used to accomplish transactions conducted with a blockchain wallet.

BACKGROUND

The creation of the blockchain mechanism for storage gave rise to a number of cryptographic currencies that have been used throughout the world. Cryptographic currencies managed using a blockchain provide for a number of benefits, including decentralization and anonymity. When using a blockchain, cryptographic currencies are controlled by individual blockchain wallets, which is represented by a private key of a cryptographic key pair that grants the possessor control over all cryptographic currency tied to that private key. One of the side effects of the anonymity granted by using a blockchain is that there are no mechanisms for the recovery of a lost or stolen private key. As a result, there have been numerous stories of a private key that has been lost when a computer has been lost or hard drive has been erased, and with it millions of dollars' worth of cryptographic currency has become inaccessible.

Some methods have been developed to assist users with preventing loss of their private keys, and thus a loss of all of the cryptographic currency associated therewith. One method is for users to keep extra copies of their private key, such as on small, portable flash drives that can be stored in a safe place for later recovery should the need arise. However, this places the private key at a greater risk for theft, where theft of any of the copies of the private key can place their entire amount of cryptographic currency at risk for an instant transfer to the thief. Another method is that some services have been created that serve as repositories for private keys, where the entity may store a user's private key and perform the necessary actions for blockchain transactions on the user's behalf. However, these services typically rely on traditional authentication techniques, which can be subject to theft and compromise in the same manner as personal possession of a private key.

Thus, there is a need for a technical solution where a private key can be retained by a trusted entity for use in a blockchain transaction on behalf of a user, but with stronger user authentication to reduce the likelihood and possibility of a nefarious actor to transact as the user or compromise the user's ability to transact.

SUMMARY

The present disclosure provides a description of systems and methods for providing additional security for a blockchain wallet through the use of a dynamic pseudo key confirmed through digit positioning. When a user registers with a service, their private key is generated or stored and a number of digit pairs identified. In order to use the private key for future transactions, the user must submit a dynamic pseudo key that can be randomly or pseudo-randomly generated. The dynamic pseudo key looks like a private key, but can have any digits in any position as long as it satisfies the identified digit pairs from the original private key, by having the same digit values in the same positions in the key. To conduct a transaction, the user submits this dynamic pseudo key to the platform, which verifies the digit positioning, and then submits the transaction to the blockchain on their behalf with the private key. In an exemplary embodiment, each pseudo key is used for only a single transaction, thus rendering theft of the dynamic pseudo key ineffective. As long as the user, or their local blockchain wallet, is aware of the registered digit pairs, any valid key can always be generated, protecting the user against loss of a key from rendering their cryptographic currency unusable. The result is significantly higher security, without sacrificing any convenience or the ability for the user to transact freely.

A method for providing additional security for a blockchain wallet through the use of a dynamic pseudo key confirmed through digit positioning includes: storing, in a memory of a processing server, a plurality of digit pairs, each digit pair including a predefined value and a character position; receiving, by a receiver of the processing server, a single use dynamic pseudo key and transaction information, where the single use dynamic pseudo key includes a plurality of characters in set positions and where the transaction information includes at least a destination address and data value; validating, by a processing device of the processing server, that the single use dynamic pseudo key has not been used for a prior blockchain transaction; validating, by the processing device of the processing server, that the plurality of characters in set positions in the single use dynamic pseudo key includes the predefined value in the corresponding character position for each of the plurality of digit pairs; generating, by the processing device of the processing server, a digital signature using a private key of a cryptographic key pair after successful validation of the plurality of characters in the single use dynamic pseudo key; and transmitting, by a transmitter of the processing server, the generated digital signature and transaction information to one of a plurality of nodes comprising a blockchain network associated with a blockchain.

A system for providing additional security for a blockchain wallet through the use of a dynamic pseudo key confirmed through digit positioning includes: a memory of a processing server configured to store a plurality of digit pairs, each digit pair including a predefined value and a character position; a receiver of the processing server configured to receive a single use dynamic pseudo key and transaction information, where the single use dynamic pseudo key includes a plurality of characters in set positions and where the transaction information includes at least a destination address and data value; a processing device of the processing server configured to validate that the single use dynamic pseudo key has not been used for a prior blockchain transaction, validate that the plurality of characters in set positions in the single use dynamic pseudo key includes the predefined value in the corresponding character position for each of the plurality of digit pairs, and generate a digital signature using a private key of a cryptographic key pair after successful validation of the plurality of characters in the single use dynamic pseudo key; and a transmitter of the processing server configured to transmit the generated digital signature and transaction information to one of a plurality of nodes comprising a blockchain network associated with a blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Use of a Dynamic Pseudo Key for Blockchain Transactions

Figure 1:
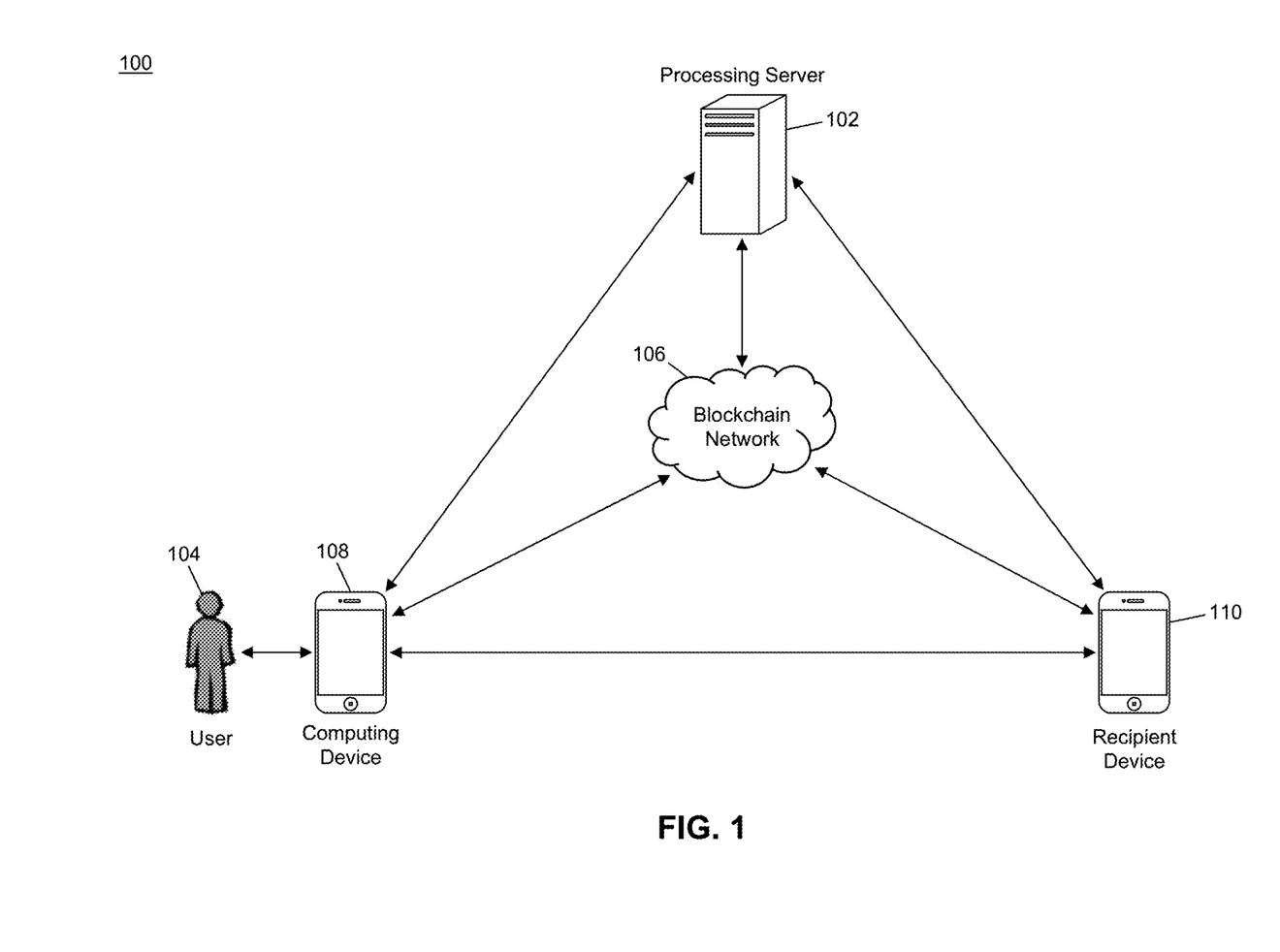
FIG. 1 is a block diagram illustrating a high level system architecture for providing additional security for a blockchain wallet through a dynamic pseudo key in accordance with exemplary embodiments.

FIG. 1 illustrates a system 100 for the use of a dynamic pseudo key to provide for additional security in the conducting of cryptographic currency transactions on a blockchain using a blockchain wallet.

The system 100 may include a processing server 102. The processing server 102, discussed in more detail below, may be configured to initiate blockchain transactions for a user 104 on behalf thereof using a private key associated therewith, through the use of a dynamic pseudo key that is confirmed using digit positioning. In the system 100, the user 104 may register a blockchain wallet with the processing server 102. A blockchain wallet may be associated with a blockchain network 106 that is used to transmit and receive blockchain currency in electronic payment transactions conducted via the blockchain network 106. A blockchain wallet may be an application program that is executed by a computing device authorized by the user 104. Traditionally, the user 104 may have a computing device 108 that is used as their blockchain wallet, where the computing device 108 performs all functions related to the conducting of blockchain transactions involving the user 104. The computing device 108 may be any type of computing device suitable for possessing and utilizing a blockchain wallet, such as a desktop computer, laptop computer, tablet computer, notebook computer, cellular phone, smart phone, smart watch, smart television, wearable computing device, implantable computing device, etc.

A blockchain wallet may include a private key of a cryptographic key pair that is used to generate digital signatures that serve as authorization by the user 104 for a blockchain transaction, where the digital signature can be verified by the blockchain network 106 using the public key of the cryptographic key pair. In some cases, the term "blockchain wallet" may refer specifically to the private key. In other cases, the term "blockchain wallet" may refer to any computing device that stores the private key for use thereof in blockchain transactions or is used by the user 104 to participate in a blockchain transaction, such as the computing device 108. As discussed herein, the processing server 102 may store the private key for the user 104, while the user 104 may still use the computing device 108 for use of the dynamic pseudo key, discussed in more detail below, such that both the computing device 108 and processing server 102 operate as part of the user's collective "blockchain wallet."

The blockchain network 106 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node in the blockchain network 106. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 106 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a blockchain transaction. A blockchain transaction may consist of at least: a digital signature of the sender of currency (e.g., the user 104) that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction. In some cases, a blockchain transaction may also include the sender's public key, for use by any entity in validating the transaction. For the processing of a blockchain transaction, such data may be provided to a node in the blockchain network 106, either by the sender or the recipient. The node may verify the digital signature and the sender's access to the funds, and then include the blockchain transaction in a new block. The new block may be validated by other nodes in the blockchain network 106 before being added to the blockchain and distributed to all of the nodes in the blockchain network 106.

In a standard blockchain transaction where the user 104 is a sender, a digital signature may be generated using the user's private key, as discussed in more detail below through the use of a dynamic pseudo key. The recipient, illustrated in FIG. 1 by the recipient device 110, may generate a blockchain address using its own public key, which may be provided to the computing device 108. In some cases, the recipient device 110 may provide the computing device 108 with its public key, where the computing device 108 may generate the blockchain address. The computing device 108 may then submit the required information to the processing server 102 for submission to a node in the blockchain network 106 for processing.

In the system 100, the user 104 may register with the processing server 102 for use of the platform that enables the user 104 to use a dynamic pseudo key for blockchain transactions. The processing server 102 may store a private key for the user's blockchain wallet. In some embodiments, the user 104 may generate or otherwise identify (e.g., via the computing device 108) a private key that is submitted to the processing server 102 as part of the registration process. In other embodiments, the processing server 102 may generate a cryptographic key pair including the private key, and may retain the private key as a result. In some such embodiments, the user 104 and computing device 108 may never possess or otherwise have access to the private key.

As part of the registration process, the processing server 102 may identify a plurality of digit pairs in the private key, where the plurality of digit pairs includes at least a predetermined number of pairs. In some cases, the processing server 102 may specify the predetermined number. In some instances, the user 104 may be able to select the number of digit pairs as part of the registration process, which may be at least the predetermined number, but may also exceed the predetermined number. In some instances, the processing server 102 may specify a range such that the number of digit pairs does not exceed a second predetermined number. Each digit pair may be comprised of a digit value from the private key and a position of the digit in the private key. Additional information regarding digit pairs and positioning can be found in FIG. 3, discussed in more detail below.

The processing server 102 may register the private key and the plurality of digit pairs in a profile associated with the user 104. In some cases, a unique identifier may be assigned to the profile, referred to herein as an "account identifier," which may be provided to the computing device 108 as part of the registration process, where the account identifier may be used in future communications from the computing device 108 to the processing server 102, such that the processing server 102 can easily identify the private key and plurality of digit pairs associated with the user 104. As part of the registration process, the processing server 102 may also transmit the plurality of digit pairs to the computing device 108 using a suitable communication network and method. In some embodiments, the plurality of digit pairs may be set by the computing device 108 (e.g., by the device itself or following instructions of the user 104), which may be communicated to the processing server 102 as part of the registration process.

The computing device 108 may store the plurality of digit pairs, such as in memory of the computing device 108 accessible by a blockchain wallet application program that may be used by the user 104 to perform the functions discussed herein. In cases where the user 104 is a recipient for a blockchain transaction, the computing device 108 may be in possession of the public key for the blockchain wallet and be configured to generate and submit recipient addresses for use in receiving cryptographic currency. In cases where the user 104 is a sender, the computing device 108 may be configured to generate a dynamic pseudo key prior to such transactions. The dynamic pseudo key may be a key that has the same conditions (e.g., number of values, types of values, etc.) as the private key, which may be randomly or pseudo-randomly generated by the computing device 108. As part of the generation of the dynamic pseudo key, the computing device 108 may ensure that the dynamic pseudo key includes the digit values in the appropriate digit positions as specified in the plurality of digit pairs. In some cases, the full dynamic pseudo key may be generated, with the values replaced to accommodate the plurality of digit pairs. In other cases, the dynamic pseudo key may be generated around the plurality of digit pairs, such that the digits in the specified positions always have the values as set forth in the plurality of digit pairs.

When the user 104 is to participate in a blockchain transaction as a sender, the computing device 108 may submit the requisite transaction information (e.g., recipient address, transaction output address(es), transaction amount) to the processing server 102 along with the dynamic pseudo key. In some cases, the account identifier associated with the user's account may be included in the transmission to the processing server 102. The processing server 102 may receive the dynamic pseudo key and (e.g., aided by the account identifier) validate that the digit values and positions in the dynamic pseudo key match the plurality of digit pairs registered to the user's account. If any of the digits in the dynamic pseudo key do not match the digit values in the positions set in the registered plurality of digit pairs, then the processing server 102 may deny use of the dynamic pseudo key, and, by extension, the user's private key. The user 104 may be notified, via a message transmitted to the computing device 108, of the failed verification of the dynamic pseudo key, where the user 104 may be invited to try again. In cases where a nefarious actor is attempting to use the user's private key, the user 104 may be accordingly notified of the attempt, where the processing server 102 may provide any additional information that may be used by the user 104 to potentially identify the nefarious party, such as information regarding the computing device used for the submission.

If the dynamic pseudo key has the correct digits in the correct positions, then the processing server 102 may use the private key registered with the user's blockchain wallet to generate a digital signature. The digital signature may be submitted to a node in the blockchain network 106 with the supplied transaction information, and a new blockchain transaction confirmed and added to the blockchain accordingly. In some cases, the processing server 102 will submit the new transaction directly. In other cases, the processing server 102 may return the digital signature to the computing device 108, where the computing device 108 may submit the digital signature and transaction information to a node in the blockchain network for processing. The node in the blockchain network 106 may receive the transaction information and digital signature, validate the digital signature using the public key of the cryptographic key pair, then confirm the transaction and add it to a new block that is confirmed and added to the blockchain using traditional methods and systems. As a result, the user 104 may send cryptographic currency in a blockchain transaction using the dynamic pseudo key without being in possession of the private key.

In some embodiments, each dynamic pseudo key may be single use. In such embodiments, the processing server 102 and/or computing device 108 may maintain a record of each dynamic pseudo key submitted to the processing server 102 and used for a blockchain transaction. When a dynamic pseudo key is submitted to the processing server 102 by the computing device 108, the processing server 102 may identify if the dynamic pseudo key has been used previously. If it had already been used, the transaction may be prevented, such as to prevent an unauthorized party from obtaining a copy of a dynamic pseudo key to use while posing as the user 104. If the dynamic pseudo key had not been previously used, the transaction may take place as discussed above, where the processing server 102 may store the dynamic pseudo key in the user's account profile to prevent usage in a future blockchain transaction. The single use of a dynamic pseudo key may thus increase the security provided to the user 104.

The methods and systems discussed herein thus enable a user 104 to conduct a blockchain transaction without being in possession or having access to a private key. The use of a dynamic pseudo key with set digit positioning means that a randomly generated or pseudo randomly generated key can be used provided the proper digit positions are known, which may be exceedingly difficult for a nefarious actor to solve, while making it easy for the user 104 to conduct transactions. In cases where the dynamic pseudo key may be single use, the security of the user's blockchain wallet is increased even more, as theft of any key may be ineffective. In cases where several digit pairs are used and where the keys themselves are of sufficient digits and complexity, the ability for any entity to identify the proper digit pairs and create a suitable and unused dynamic pseudo key may be so difficult and resource intensive to be not worth the time and effort required. Thus, the methods and systems discussed herein provide users with high levels of security when conducting blockchain transactions without sacrificing convenience an ease of use.

Processing Server

Figure 2:
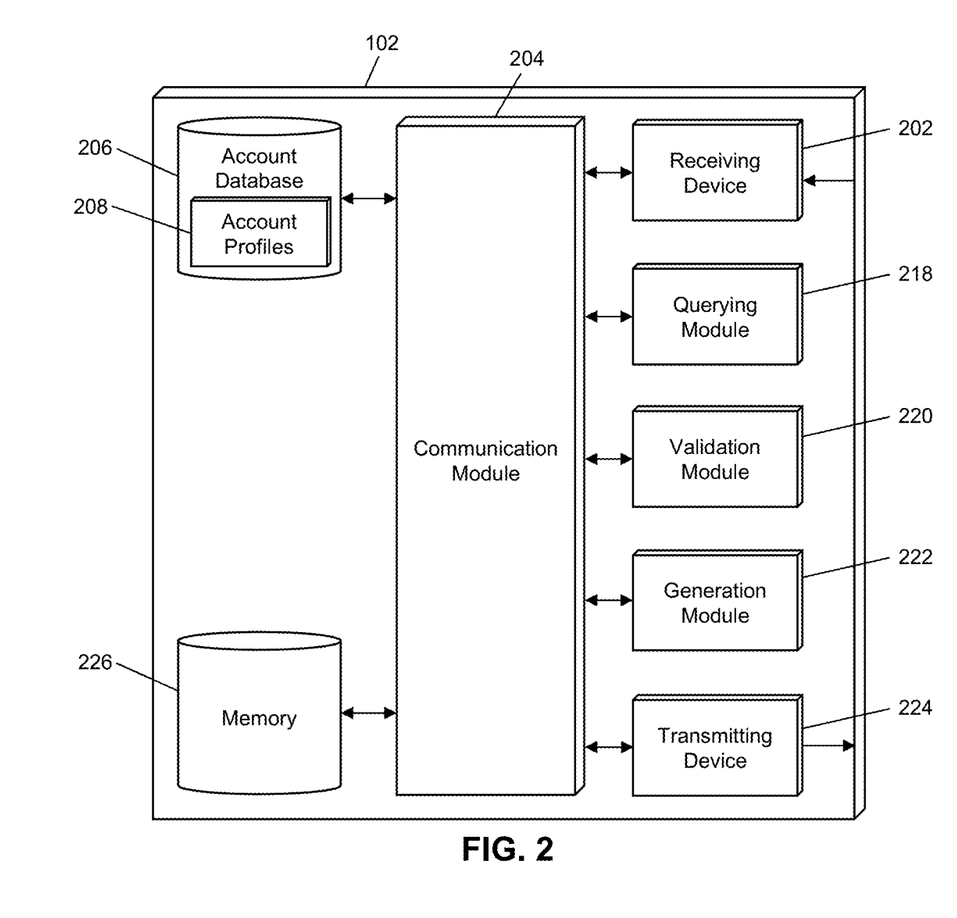
FIG. 2 is a block diagram illustrating a processing server of the system of FIG. 1 for the use of a dynamic pseudo key to conduct blockchain transactions with additional security in accordance with exemplary embodiments.

FIG. 2 illustrates an embodiment of a processing server 102, such as the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain networks 106, computing devices 108, recipient devices 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by nodes in a blockchain network 106 that are superimposed or otherwise encoded with transaction notifications, new transaction data values, blocks for confirmation and/or addition to the blockchain, etc. The receiving device 202 may also be configured to receive data signals electronically transmitted by computing devices 108 and recipient devices 110, which may be superimposed or otherwise encoded with registration information (e.g., private keys, predetermined numbers of digit pairs, digit pairs, account identifiers, etc.) and transaction requests, which may include a dynamic pseudo key, account identifier, one or more transaction output addresses, one or more recipient addresses, and one or more currency amounts.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, validation module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be related to a blockchain wallet registered by a user 104 and may include at least an account identifier, private key, and plurality of digit pairs. In cases where a dynamic pseudo key is single-use, an account profile 208 may include a list of used dynamic pseudo keys that may not be reused in future transactions.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 related to a received transaction request using the account identifier, such as to identify digit pairs for use in validating a dynamic pseudo key.

The processing server 102 may also include a validation module 220. The validation module 220 may be configured to perform validations for the processing server 102 as part of the functions discussed herein. The validation module 220 may receiving instructions as input, may perform a validation as instructed, and may output a result of the validation to another module or engine of the processing server 102. In some cases, data to be used in the validation may be included in the input. In some instances, the validation module 220 may be configured to identify data for use in the verification, such as by instructing the querying module 218 to perform one or more queries for data. The validation module 220 may, for example, be configured to validate a dynamic pseudo key based on a plurality of digit pairs, such as by checking to see if each digit position in the dynamic pseudo key has a digit value that matches the corresponding digit position in the digit pairs. In cases where dynamic pseudo keys are single-use, the validation module 220 may also validate that a dynamic pseudo key has not been used in a prior blockchain transaction.

The processing server 102 may also include a generation module 222. The generation module 222 may be configured to generate data for use by the processing server 102 in performing the functions discussed herein. The generation module 222 may be configured to receive instructions as input, generate data as instructed, and output the generated data to another module or engine of the processing server 102. The generation module 222 may be provided with data to be used in the generation as part of the input, and/or may be configured to identify additional data to be used in the generation, such as by instructing the querying module 218 to identify such data. The generation module 222 may be configured to, for example, generate digital signatures using private keys following validation of a dynamic pseudo key.

The processing server 102 may also include a transmitting device 224. The transmitting device 224 may be configured to transmit data over one or more networks via one or more network protocols. In some instances, the transmitting device 224 may be configured to transmit data to blockchain networks 106, computing devices 108, recipient devices 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to nodes in a blockchain network 106 that are superimposed or otherwise encoded with transaction data for a new blockchain transaction including at least a digital signature, one or more transaction output addresses, one or more recipient addresses, and one or more transaction amounts. The transmitting device 224 may also be configured to electronically transmit data signals to computing devices 108 and/or recipient devices 110 that are superimposed or otherwise encoded with notifications of successful transactions, digital signatures to use in submitting new blockchain transactions, account information, digit pairs for use in generating dynamic pseudo keys, etc.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, communication data for blockchain nodes, communication data for blockchain networks 106, computing devices 108, and recipient devices 110, public keys, private keys, etc.

Digit Position Confirmation for Dynamic Pseudo Keys

Figure 3:
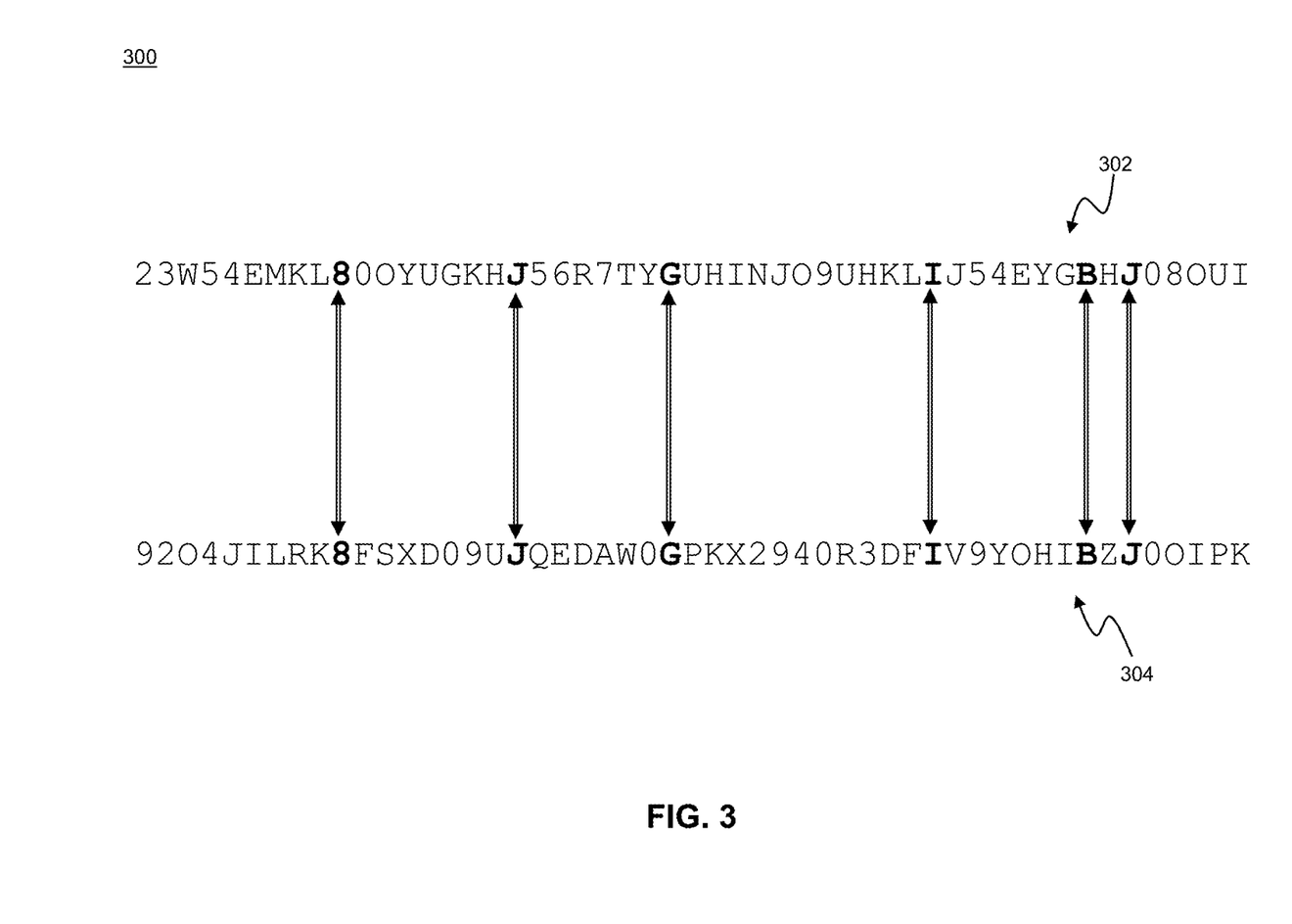
FIG. 3 is a diagram illustrating the use of digit positioning in a dynamic pseudo key for use thereof in authenticating a blockchain wallet for use of the corresponding private key in accordance with exemplary embodiments.

FIG. 3 illustrates an example validation of digit values and positions for a dynamic pseudo key for use in the system 100 of FIG. 1 as performed by the processing server 102 of FIG. 2.

As illustrated in FIG. 3, the processing server 102 may register a private key 302 with the user's account profile 208 in the account database 206 in the processing server 102. The private key 302 illustrated in FIG. 3 is made up of fifty alphanumeric characters. It will be apparent to persons having skill in the relevant art that the fifty digit key illustrated in FIG. 3 is provided as an example only, and that private keys and dynamic pseudo keys may be of any size and character type suitable for performing the functions discussed herein, such as being a 256-digit alphanumeric value.

The private key 302 may have a plurality of digit pairs that are registered as part of the account profile 208 where each dynamic pseudo key 304 that is to be used for a new blockchain transaction must be required to have the same value in the same position for each digit in the digit pairs. As illustrated in FIG. 3, the private key 302 has six registered digit pairs, illustrated by the bold typeface used for each of the digits. For example, the digit pairs include a requirement that the tenth digit in a key must be the number "8." As illustrated, the dynamic pseudo key 304 submitted by the computing device 108 may have each of the same six digit pairs included therein to be valid. Even in instances where digits may match from the dynamic pseudo key 304 to the private key 302, only the registered digit pairs may be considered by the validation module 220 for validation of the dynamic pseudo key.

Process for Validation of a Dynamic Pseudo Key for a Blockchain Transaction

Figure 4:
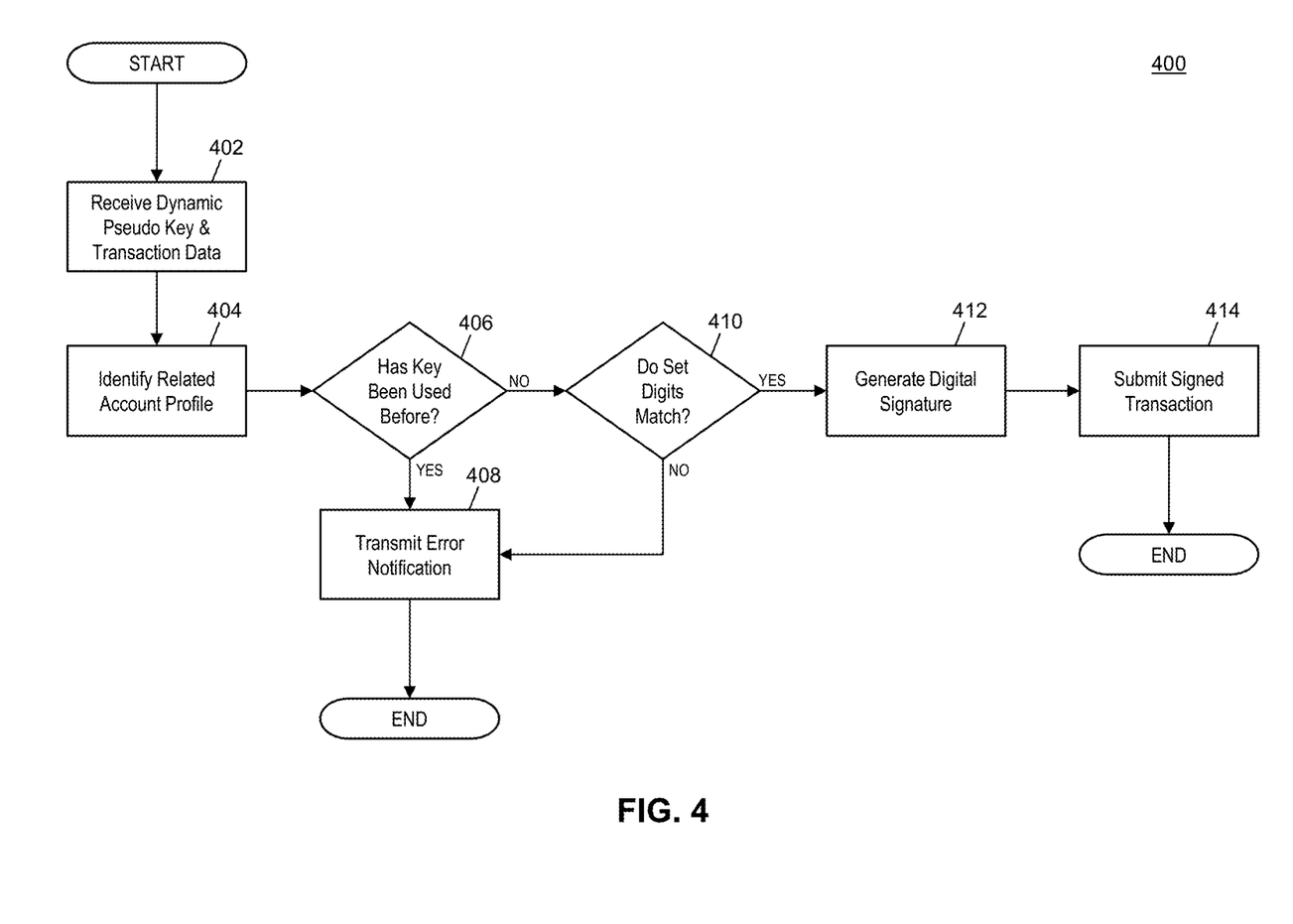
FIG. 4 is a flow diagram illustrating a process for use of a dynamic pseudo key to conduct a blockchain transaction using an associated private key as performed by the processing server of FIG. 2 in accordance with exemplary embodiments.

FIG. 4 illustrates a process 400 executed by the processing server 102 of FIG. 2 for use in the system 100 of FIG. 1 for validating a dynamic pseudo key submitted by a computing device 108 for the initiation of a blockchain transaction for a registered blockchain wallet.

In step 402, the receiving device 202 of the processing server 102 may receive a dynamic pseudo key, an account identifier, and transaction data submitted by a computing device 108 using a suitable communication network and method. The transaction data may include at least one or more output addresses, one or more recipient addresses, and one or more transaction amounts. In step 404, the querying module 218 of the processing server 102 may execute a query on the account database 206 of the processing server 102 to identify an account profile 208 associated with the user 104 using the account identifier.

In step 406, the processing server 102 may determine if the received dynamic pseudo key has been used before. The determination may be based on a query in the account profile 208 to identify if the received dynamic pseudo key is stored in the account profile 208 as having been used in a prior blockchain transaction. If the dynamic pseudo key has previously been used, then in step 408, the transmitting device 224 of the processing server 102 may electronically transmit a notification to the computing device 108 indicating an error in the validation. In some cases, the notification may indicate the reason for the error, such as the prior use of the dynamic pseudo key.

If the dynamic pseudo key has not been previously used, then, in step 410, the validation module 220 of the processing server 102 may validate the digits in the dynamic pseudo by checking for a match with the registered plurality of digit pairs in the identified account profile 208. If not all of the digits match the registered digit pairs, then the process 300 may go to step 408 where an error notification is electronically transmitted to the computing device 108 by the transmitting device 224. In some cases, the notification may indicate that validation of the dynamic pseudo key failed. If the dynamic pseudo key is successfully validated (e.g., it has all of the correct digit values in the correct positions from the plurality of digit pairs), then, in step 412, the generation module 222 of the processing server 102 may generate a digital signature using the private key stored in the identified account profile 208. In step 414, the transmitting device 224 of the processing server 102 may electronically transmit the received transaction information with the generated digital signature to a node in the blockchain network 106 for confirmation and addition to the blockchain.

Exemplary Method for Use of a Dynamic Pseudo Key for a Blockchain Wallet

Figure 5:
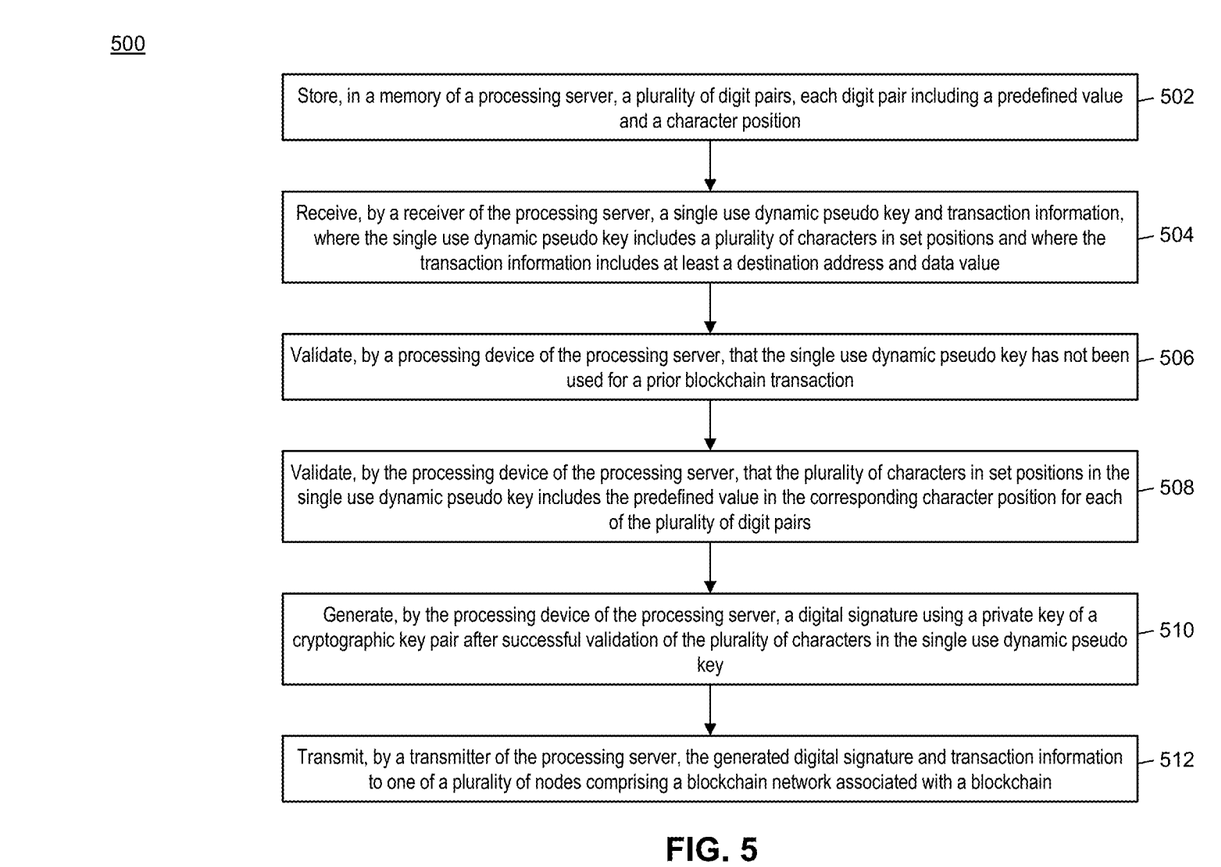
FIG. 5 is a flow chart illustrating an exemplary method for providing additional security for a blockchain wallet through the use of a dynamic pseudo key confirmed through digit positioning in accordance with exemplary embodiments.

FIG. 5 illustrates a method 500 for providing additional security for a blockchain wallet through the use of a dynamic pseudo key confirmed through digit positioning.

In step 502, a plurality of digit pairs may be stored in a memory (e.g., an account profile 208, the memory 226, etc.) of a processing server (e.g., the processing server 102), where each digit pair includes a predefined value and a character position. In step 504, a single use dynamic pseudo key and transaction information may be received by a receiver (e.g., the receiving device 202) of the processing server, where the single use dynamic pseudo key includes a plurality of characters in set positions and where the transaction information includes at least a destination address and data value. In step 506, a processing device (e.g., the validation module 220) of the processing server may validate that the single use dynamic pseudo key has not been used for a prior blockchain transaction.

In step 508, the processing device of the processing server may validate that the plurality of characters in set positions in the single use dynamic pseudo key includes the predefined value in the corresponding character position for each of the plurality of digit pairs. In step 510, a digital signature may be generated by the processing device (e.g., the generation module 222) of the processing server using a private key of a cryptographic key pair after successful validation of the plurality of characters in the single use dynamic pseudo key. In step 512, the generated digital signature and transaction information may be transmitted by a transmitter (e.g., the transmitting device 224) of the processing server to one of a plurality of nodes comprising a blockchain network (e.g., the blockchain network 106) associated with a blockchain.

In one embodiment, the plurality of digit pairs may be greater than a predetermined number. In some embodiments, the transaction information may further include one or more input addresses.

In one embodiment, validating that the single use dynamic pseudo key has not been used for a prior blockchain transaction may include executing a query on the memory of the processing server to identify no occurrences of the single use dynamic pseudo key in past blockchain transactions. In a further embodiment, the account profile may further include the private key. In another further embodiment, the plurality of digit pairs may be included in an account profile (e.g., an account profile 208), the account profile may further include a plurality of used pseudo keys, and the single use dynamic pseudo key may not be included in the plurality of used pseudo keys. In an even further embodiment, the account profile may further include an account identifier, and the transaction information may further include the account identifier. In a yet further embodiment, the account identifier may be a public key of the cryptographic key pair.

Computer System Architecture

Figure 6:
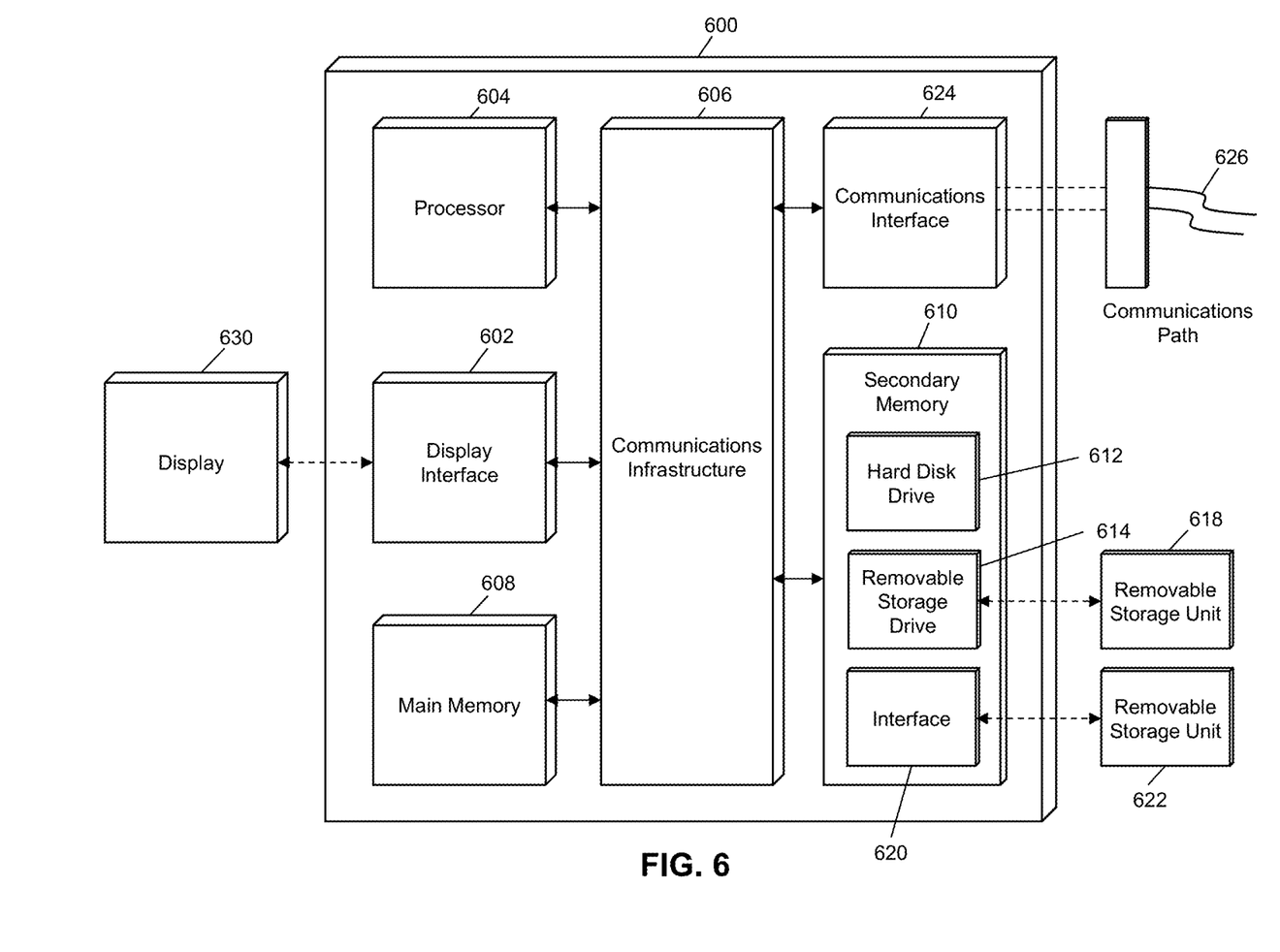
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 4 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for providing additional security for a blockchain wallet through the use of a dynamic pseudo key confirmed through digit positioning. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing additional security for a blockchain wallet through the use of a dynamic pseudo key confirmed through digit positioning, comprising:

storing, in a memory of a processing server, a plurality of digit pairs, each digit pair including a predefined value and a character position;

receiving, by a receiver of the processing server, a single use dynamic pseudo key and transaction information, where the single use dynamic pseudo key includes a plurality of characters in set positions and where the transaction information includes at least a destination address and data value;

validating, by a processing device of the processing server, that the single use dynamic pseudo key has not been used for a prior blockchain transaction;

validating, by the processing device of the processing server, that the plurality of characters in set positions in the single use dynamic pseudo key includes the predefined value in the corresponding character position for each of the plurality of digit pairs;

generating, by the processing device of the processing server, a digital signature using a private key of a cryptographic key pair after successful validation of the plurality of characters in the single use dynamic pseudo key; and transmitting, by a transmitter of the processing server, the generated digital signature and transaction information to one of a plurality of nodes comprising a blockchain network associated with a blockchain.

2. The method of claim 1, wherein the plurality of digit pairs is greater than a predetermined number.

3. The method of claim 1, wherein validating that the single use dynamic pseudo key has not been used for a prior blockchain transaction includes executing a query on the memory of the processing server to identify no occurrences of the single use dynamic pseudo key in past blockchain transactions.

4. The method of claim 3, wherein
the plurality of digit pairs are included in an account profile,
the account profile further includes a plurality of used pseudo keys, and
the single use dynamic pseudo key is not included in the plurality of used pseudo keys.

5. The method of claim 4, wherein
the account profile further includes an account identifier, and
the transaction information further includes the account identifier.

6. The method of claim 5, wherein the account identifier is a public key of the cryptographic key pair.

7. The method of claim 3, wherein the account profile further includes the private key.

8. The method of claim 1, wherein the transaction information further includes one or more input addresses.

9. A system for providing additional security for a blockchain wallet through the use of a dynamic pseudo key confirmed through digit positioning, comprising:
- a memory of a processing server configured to store a plurality of digit pairs, each digit pair including a predefined value and a character position;
- a receiver of the processing server configured to receive a single use dynamic pseudo key and transaction information, where the single use dynamic pseudo key includes a plurality of characters in set positions and where the transaction information includes at least a destination address and data value;
- a processing device of the processing server configured to
  - validate that the single use dynamic pseudo key has not been used for a prior blockchain transaction,
  - validate that the plurality of characters in set positions in the single use dynamic pseudo key includes the predefined value in the corresponding character position for each of the plurality of digit pairs, and
  - generate a digital signature using a private key of a cryptographic key pair after successful validation of the plurality of characters in the single use dynamic pseudo key; and
- a transmitter of the processing server configured to transmit the generated digital signature and transaction information to one of a plurality of nodes comprising a blockchain network associated with a blockchain.

10. The system of claim 9, wherein the plurality of digit pairs is greater than a predetermined number.

11. The system of claim 9, wherein validating that the single use dynamic pseudo key has not been used for a prior blockchain transaction includes executing a query on the memory of the processing server to identify no occurrences of the single use dynamic pseudo key in past blockchain transactions.

12. The system of claim 11, wherein
the plurality of digit pairs are included in an account profile,
the account profile further includes a plurality of used pseudo keys, and
the single use dynamic pseudo key is not included in the plurality of used pseudo keys.

13. The system of claim 12, wherein
the account profile further includes an account identifier, and
the transaction information further includes the account identifier.

14. The system of claim 13, wherein the account identifier is a public key of the cryptographic key pair.

15. The system of claim 11, wherein the account profile further includes the private key.

16. The system of claim 9, wherein the transaction information further includes one or more input addresses.

* * * * *